United States Patent
Lee et al.

(10) Patent No.: US 11,509,083 B2
(45) Date of Patent: Nov. 22, 2022

(54) ELECTRICAL CONNECTION DEVICE AND ELECTRONIC DEVICE COMPRISING SAME

(71) Applicants: SAMSUNG ELECTRONICS CO., LTD., Gyeonggi-do (KR); HIROSE KOREA CO., LTD., Gyeonggi-do (KR)

(72) Inventors: Inha Lee, Gyeonggi-do (KR); Yongjin Lee, Gyeonggi-do (KR); Hanseok Mun, Gyeonggi-do (KR); Jaeryong Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/272,793

(22) PCT Filed: Sep. 6, 2019

(86) PCT No.: PCT/KR2019/011586
§ 371 (c)(1),
(2) Date: Mar. 2, 2021

(87) PCT Pub. No.: WO2020/060088
PCT Pub. Date: Mar. 26, 2020

(65) Prior Publication Data
US 2021/0320444 A1    Oct. 14, 2021

(30) Foreign Application Priority Data

Sep. 17, 2018   (KR) .................. 10-2018-0110893

(51) Int. Cl.
*H01R 12/77*    (2011.01)
*H01R 12/79*    (2011.01)
*H04M 1/02*    (2006.01)

(52) U.S. Cl.
CPC .......... *H01R 12/775* (2013.01); *H01R 12/79* (2013.01); *H04M 1/0274* (2013.01); *H01R 2201/02* (2013.01)

(58) Field of Classification Search
CPC .... H01R 12/716; H01R 13/20; H01R 13/405; G06F 1/1698; G06F 1/1656; G06F 1/1626
See application file for complete search history.

(56) References Cited

U.S. PATENT DOCUMENTS

| | | | |
|---|---|---|---|
| 10,249,969 B2* | 4/2019 | Ono | H01R 13/504 |
| 2005/0200373 A1* | 9/2005 | Yakymyshyn | G01R 31/311 |
| | | | 324/754.23 |

(Continued)

FOREIGN PATENT DOCUMENTS

| | | |
|---|---|---|
| JP | 3206448 | 9/2016 |
| KR | 101505027 | 3/2015 |

(Continued)

OTHER PUBLICATIONS

PCT/ISA/210 Search Report issued on PCT/KR2019/011586, dated Dec. 20, 2019, pp. 6.

(Continued)

*Primary Examiner* — Jean F Duverne
(74) *Attorney, Agent, or Firm* — The Farrell Law Firm, P.C.

(57) ABSTRACT

The present invention suggests an electrical connection device having a noise blocking and damage preventing structure by comprising: a receptacle consisting of a plurality of conductive terminals and a plurality of conductive members; and a connector comprising a plurality of connector terminals corresponding to the plurality of conductive terminals.

18 Claims, 13 Drawing Sheets

(56) References Cited

U.S. PATENT DOCUMENTS

| | | |
|---|---|---|
| 2013/0280926 A1 | 10/2013 | Ono |
| 2014/0287610 A1 | 9/2014 | Komoto et al. |
| 2014/0378007 A1 | 12/2014 | Miyazaki et al. |
| 2015/0194753 A1* | 7/2015 | Raff .................. H01R 12/716 |
| | | 29/830 |
| 2015/0200477 A1 | 7/2015 | Kim et al. |
| 2015/0270633 A1 | 9/2015 | Kodaira |
| 2017/0018868 A1 | 1/2017 | Lee et al. |
| 2018/0226736 A1* | 8/2018 | Hirakawa ............ H01R 13/639 |

FOREIGN PATENT DOCUMENTS

| | | |
|---|---|---|
| KR | 1020150075029 | 7/2015 |
| KR | 1020150084563 | 7/2015 |

OTHER PUBLICATIONS

PCT/ISA/237 Written Opinion issued on PCT/KR2019/011586, dated Dec. 20, 2020, pp. 5.
European Search Report dated Sep. 24, 2021 issued in counterpart application No. 198621187-1216, 12 pages.

\* cited by examiner

ELECTRICAL CONNECTION DEVICE AND ELECTRONIC DEVICE COMPRISING SAME

PRIORITY

This application is a National Phase Entry of PCT International Application No. PCT/KR2019/011586 which was filed on Sep. 6, 2019, and claims priority to Korean Patent Application No. 10-2018-0110893, which was filed on Sep. 17, 2018, the content of each of which is incorporated herein by reference.

TECHNICAL FIELD

Various embodiments of the disclosure relate to an electrical connection device and an electronic device including the same.

BACKGROUND ART

In general, an electronic device may include therein multiple electronic components (an electronic function group). The electronic components may be arranged in the state of being spaced apart from each other at predetermined intervals in the electronic device. Such a spaced arrangement may be provided due to a design structure between respective accessories in the electronic device, or may be provided in order to prevent the performance of counterpart accessories from being degraded due to noise generated from each accessory.

For the electrical connection between at least two electronic components described above, it is necessary to add a separate electrical connection device. Such an electrical connection device should be excellent in durability even if the electronic device is used for a long period of time and external impacts are applied to the electronic device, and should have a reliable electrical connection structure capable of blocking noise.

DETAILED DESCRIPTION OF INVENTION

Technical Problem

An electronic device may have a configuration in which individual electronic components, which are arranged to be spaced apart from each other, are electrically connected to each other in order to implement various functions. In such a case, a first electronic component and a second electronic component may be electrically connected to each other via an electrical connection device. For example, the electrical connection device may include a cable having a predetermined length (e.g., a flexible printed circuit board (FPCB)), and two electronic components can be electrically connected to each other by bringing a connector (e.g., a plug) installed at an end of the cable into physical contact with a receptacle provided on the counterpart electronic component.

In recent years, it has come to be a trend to apply wireless communication technology of an ultra-high frequency band (e.g., 5G communication technology) to electronic devices in response to an increase in network capacity. In this case, when the above-described electrical connection device is used for transmitting ultra-high frequency signals (e.g., ultra-high-frequency RF signals) in order to electrically connect an communication device and a printed circuit board to each other inside an electronic device, mutual interference between respective signal terminals occurs or noise is provided to electrical components disposed adjacent thereto, which may cause malfunction or quality deterioration of the electronic device.

Moreover, when an electrical connection device is assembled in the state in which a receptacle and a connector are separated from each other during a manufacturing process, an electrical connection failure may occur due to a misalignment between base structures, which are injection-molded products.

Various embodiments of the disclosure are capable of providing an electrical connection device and an electronic device including the same.

Various embodiments are capable of providing an electrical connection device having a structure capable of blocking noise that may be transmitted to peripheral terminals or peripheral electrical components, and an electronic device including the same.

Various embodiments are capable of providing an electrical connection device having a structure capable of preventing breakage of a base structure that may occur during an assembly process, and an electronic device including the same.

Solution to Problem

According to various embodiments, an electronic device may include a housing, a printed circuit board (PCB) disposed inside the housing, a receptacle mounted on the printed circuit board, and a connector removably coupled to the receptacle. The receptacle may include a base structure including a first surface facing away from the printed circuit board, a second surface facing away from the first surface and mounted on the printed circuit board, and a side surface surrounding the space between the first surface and the second surface. The side surface may include a first side surface, a second side surface extending from the first side surface in a vertical direction, a third side surface extending from the second side surface in a direction parallel to the first side surface, and a fourth side surface extending from the third side surface in a direction parallel to the second side surface. The base structure may include an edge area and an island area defined by a recess having a predetermined depth from the first surface toward the second surface. The receptacle may further include multiple first conductive terminals arranged side by side between the edge area and the island area along at least a portion of the first side surface, multiple second conductive terminals arranged side by side between the edge area and the island area along at least a portion of the third side surface, a first conductive member disposed on the first side surface, a second conductive member disposed on the third side surface, a third conductive member disposed from a periphery of the second side surface to at least a portion of the island area, and a fourth conductive member disposed from a periphery of the fourth side surface to at least a portion of the island area. The connector may include a connector base including a first connector surface facing the first surface of the receptacle and a second connector surface facing away from the first connector surface, a connector edge area including an island seating portion seated in the recess, and multiple connector terminals disposed at positions corresponding to the first conductive terminals and the second conductive terminals in the connector edge area.

According to various embodiments, a receptacle to be coupled with a connector may include a base structure including a first surface, a second surface facing away from the first surface and mounted on the printed circuit board, and a side surface surrounding the space between the first surface and the second surface. The side surface may include a first side surface, a second side surface extending from the first side surface in a vertical direction, a third side surface extending from the second side surface in a direction parallel to the first side surface, and a fourth side surface extending from the third side surface in a direction parallel to the second side surface. The base structure may include an edge area and an island area defined by a recess having a predetermined depth from the first surface toward the second surface. The receptacle may further include multiple first conductive terminals arranged side by side between the edge area and the island area along at least a portion of the first side surface, multiple second conductive terminals arranged side by side between the edge area and the island area along at least a portion of the third side surface, a first conductive member disposed on the first side surface, a second conductive member disposed on the third side surface, a third conductive member disposed from a periphery of the second side surface to at least a portion of the island area, and a fourth conductive member disposed from a periphery of the fourth side surface to at least a portion of the island area.

Advantageous Effects of Invention

According to various embodiments of the disclosure, it is possible to possible to prevent malfunction and secure the reliability of a device by providing a shield structure capable of blocking noise that may be transmitted to peripheral terminals or peripheral electrical components, and it is possible to prevent a connection failure which may occur during an assembly process by applying a reinforced rigid assembly structure.

BRIEF DESCRIPTION OF DRAWINGS

In connection with the description of drawings, the same or similar components may be denoted by the same or similar reference numeral.

MODE FOR THE INVENTION

Figure 1:
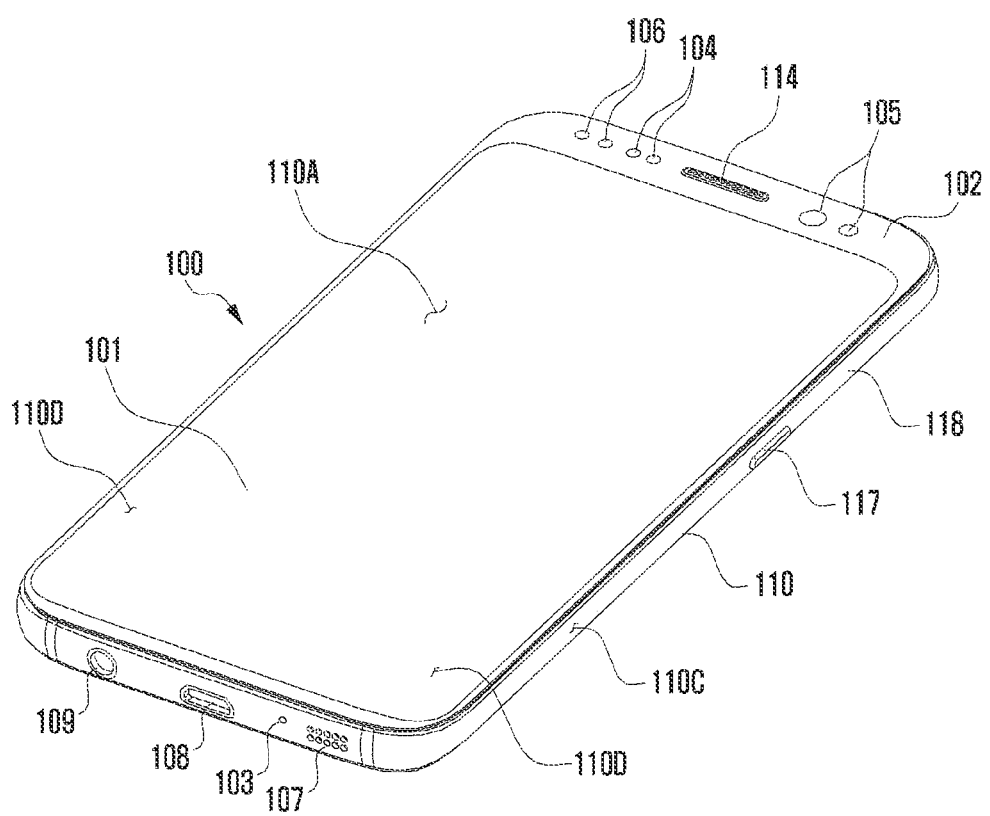
FIG. 1 is a front perspective view illustrating a mobile electronic device according to various embodiments of the disclosure.
Figure 2:
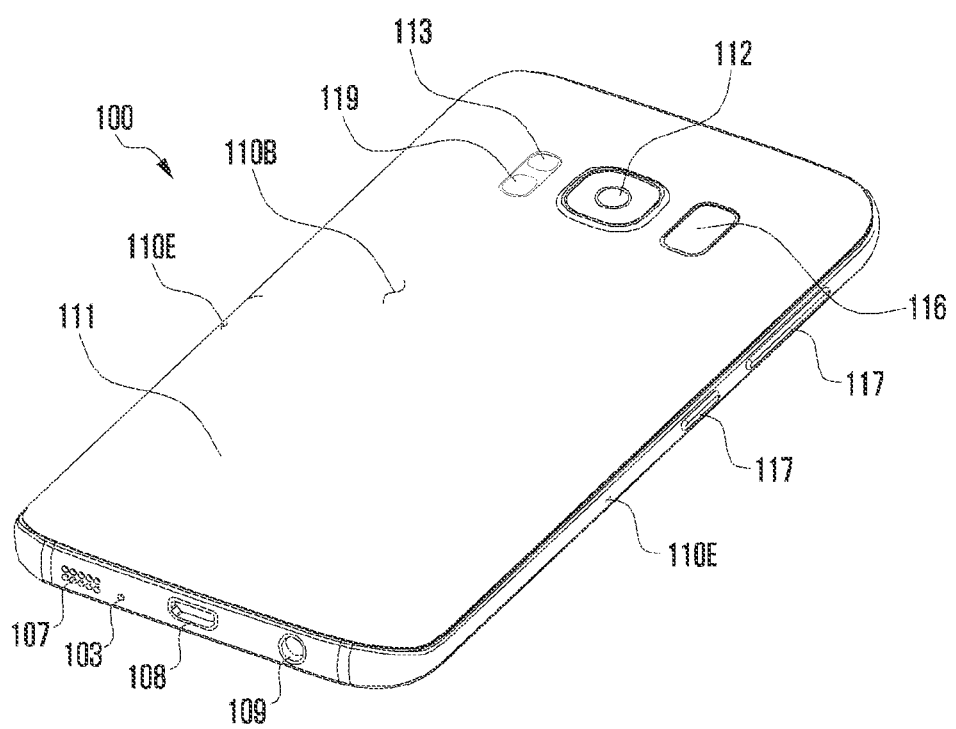
FIG. 2 is a rear perspective view illustrating the electronic device of FIG. 1 according to various embodiments.

FIG. 1 is a perspective view illustrating a front surface of a mobile electronic device according to an embodiment of the disclosure. FIG. 2 is a perspective view illustrating a rear surface of the electronic device of FIG. 1 according to an embodiment of the disclosure.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to another embodiment, the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 111A toward the rear plate 111. In the shown embodiment, the rear plate 111 may include two second regions 110E disposed at long edges thereof, respectively, and bent and extended seamlessly from the second surface 110B toward the front plate 102 (refer to FIG. 2). In various embodiments, the front plate 102 (or the rear plate 111) may include only one of the first regions 110D (or of the second regions 110E). In various embodiments, the first regions 110D or the second regions 110E may be omitted in part. In the embodiments, w % ben viewed from a lateral side of the electronic device 100, the lateral bezel structure 118 may have a first thickness (or width) on a lateral side where one of the first regions 110D or one of the second regions 110E is not included, and may have a second thickness, being less than the first thickness, on another lateral side where one of the first regions 110D or one of the second regions 110E is included.

According to an embodiment, the electronic device 100 may include at least one of a display 101, audio modules 103, 107 and 114, sensor modules 104, 116 and 119, camera modules 105, 112 and 113, key input devices 117, a light emitting device 106, and connector holes 108 and 109. In various embodiments, the electronic device 100 may omit at least one (e.g., the key input devices 117 or the light emitting device 106) of the above components, or may further include other components.

The display 101 may be exposed through a substantial portion of the front plate 102, for example. In various embodiments, at least a part of the display 101 may be exposed through the front plate 102 that forms the first surface 110A and the first regions 110D. In various embodiments, outlines (i.e., edges and corners) of the display 101 may have substantially the same form as those of the front plate 102. In another embodiment (not shown), the spacing between the outline of the display 101 and the outline of the front plate 102 may be substantially unchanged in order to enlarge the exposed area of the display 101.

In another embodiment (not shown), a recess or opening may be formed in a portion of a display area of the display 101 to accommodate at least one of the audio modules (e.g., the audio module 114), the sensor module 104, the camera module 105, and the light emitting device 106. In another embodiment (not shown), at least one of the audio modules (e.g., the audio module 114), the sensor module 104, the camera module 105, the sensor module 116 (e.g., a fingerprint sensor), and the light emitting device 106 may be disposed on the back of the display area of the display 101. In another embodiment (not shown), the display 101 may be combined with, or adjacent to, a touch sensing circuit, a pressure sensor capable of measuring the touch strength (pressure), and/or a digitizer for detecting a stylus pen. In various embodiments, at least a part of the sensor modules 104 and 119 and/or at least a part of the key input devices 117 may be disposed in one of the first regions 110D and/or one of the second regions 110E.

The audio modules 103, 107 and 114 may correspond to a microphone hole (e.g., the audio module 103) and speaker holes (e.g., the audio modules 107 and 114). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 104, 116 and 119 may generate electrical signals or data corresponding to an internal operating state of the electronic device 100 or to an external environmental condition. The sensor modules 104, 116 and 119 may include a first sensor module (e.g., the sensor module 104) (e.g., a proximity sensor) and/or a second sensor module (e.g., a fingerprint sensor) disposed on the first surface 110A of the housing 110, and/or a third sensor module (e.g., the sensor module 119) (e.g., a heart rate monitor (HRM) sensor) and/or a fourth sensor module (e.g., the sensor module 116) (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device (e.g., the camera module 105) disposed on the first surface 110A of the electronic device 100, and a second camera device (e.g., the camera module 112) and/or a flash (e.g., the camera module 113) disposed on the second surface 110B. The camera module 105 or the camera module 112 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 100.

The key input devices 117 may be disposed on the lateral surface 110C of the housing 110. In another embodiment, the electronic device 100 may not include some or all of the key input devices 117 described above, and the key input devices 117 which are not included may be implemented in another form such as a soft key on the display 101. In various embodiments, the key input devices 117 may include the sensor module 116 disposed on the second surface 110B of the housing 110.

The light emitting device 106 may be disposed on the first surface 110A of the housing 110, for example. For example, the light emitting device 106 may provide status information of the electronic device 100 in an optical form. In various embodiments, the light emitting device 106 may provide a light source associated with the operation of the camera module 105. The light emitting device 106 may include, for example, a light emitting diode (LED), an infrared (IR) LED, or a xenon lamp.

The connector holes 108 and 109 may include a first connector hole (e.g., the connector hole 108) adapted for a connector (e.g., a universal serial bus (USB) connector) for transmitting and receiving power and/or data to and from an external electronic device, and/or a second connector hole (e.g., the connector hole 109) adapted for a connector (e.g., an earphone jack) for transmitting and receiving an audio signal to and from an external electronic device.

Figure 3:
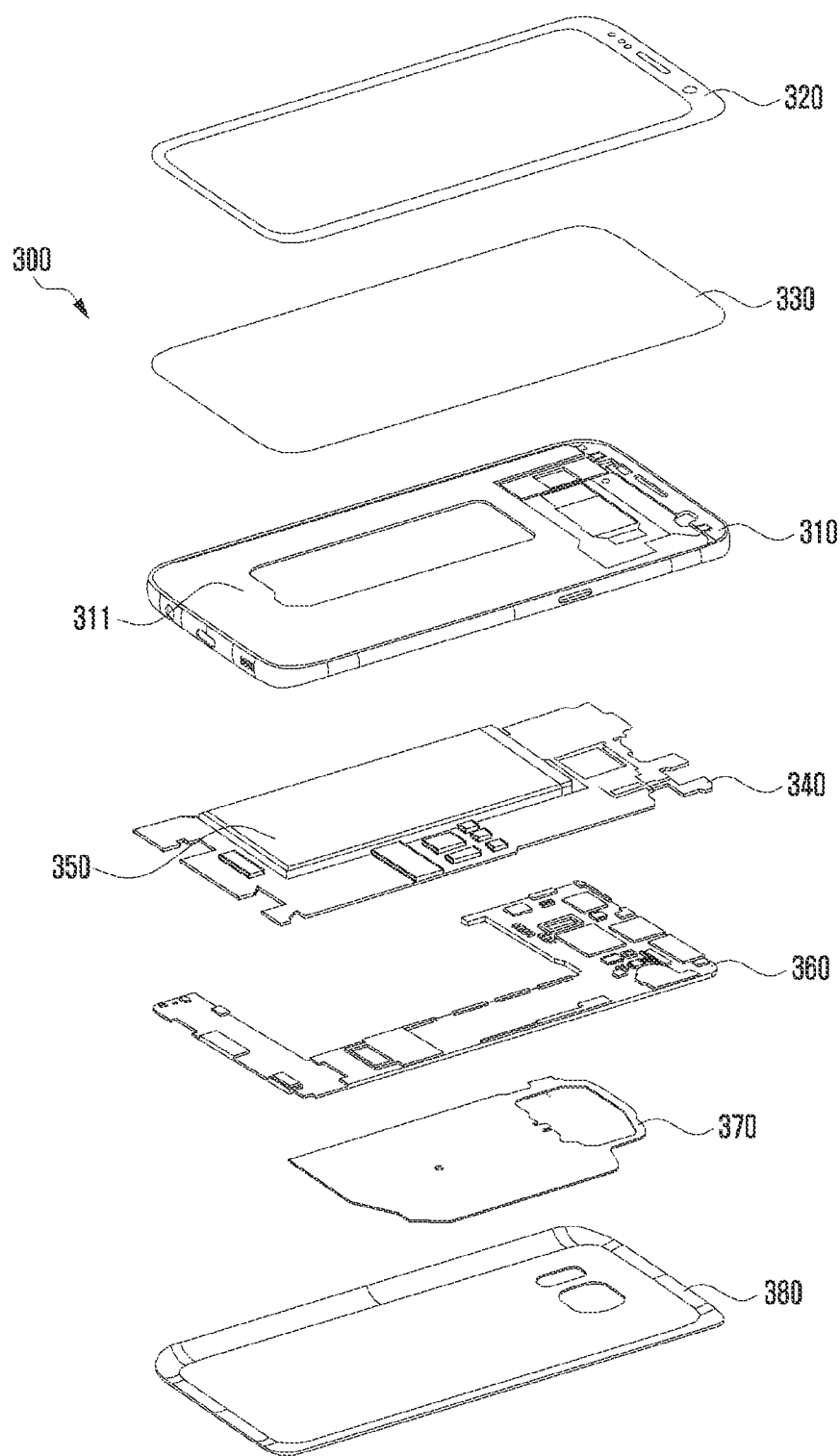
FIG. 3 is a exploded perspective view illustrating the electronic device of FIG. 1 according to various embodiments.

FIG. 3 is an exploded perspective view illustrating the electronic device of FIG. 1 according to an embodiment of the disclosure.

Referring to FIG. 3, an electronic device 300 (e.g., the electronic device 100 of FIG. 1) may include a lateral bezel structure 310, a first support member 311 (e.g., a bracket), a front plate 320, a display 330 (e.g., the display 101), a printed circuit board (PCB) 340, a battery 350, a second support member 360 (e.g., a rear case), an antenna 370, and a rear plate 380. In various embodiments, the electronic device 300 may omit at least one (e.g., the first support member 311 or the second support member 360) of the above components or may further include another component. Some components of the electronic device 300 may be the same as or similar to those of the electronic device 100 shown in FIG. 1 or FIG. 2, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
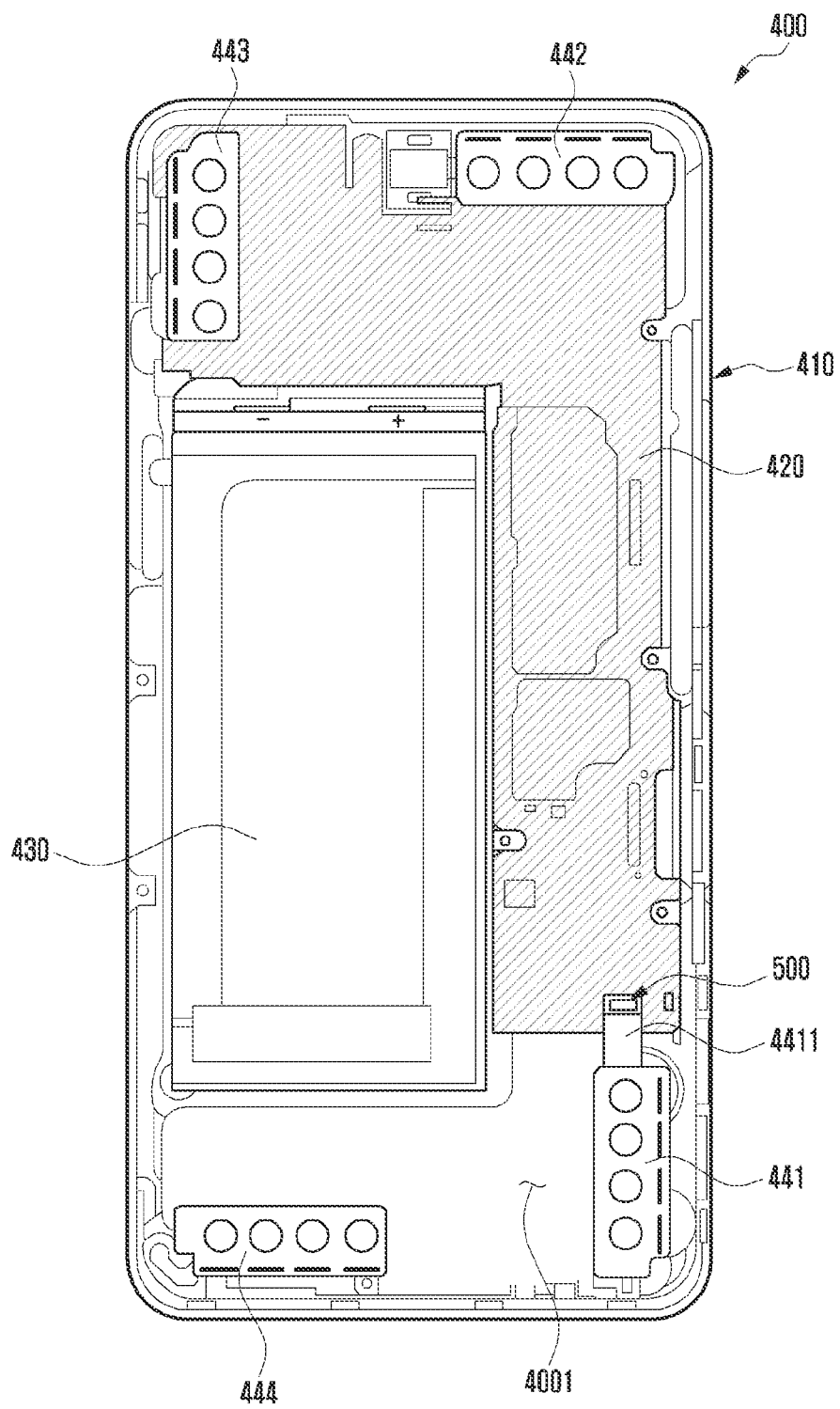
FIG. 4 is a view illustrating the configuration of an electronic device to which an electrical connection device according to various embodiments of the disclosure is applied.

FIG. 4 is a view illustrating the configuration of an electronic device 400 to which an electrical connection device 500 according to various embodiments of the disclosure is applied.

The electronic device 400 of FIG. 4 may be at least partially similar to the electronic device 100 in FIGS. 1 and 2 or the electronic device 300 of FIG. 3, or may include another embodiment of the same.

Referring to FIG. 4, the electronic device 400 may include multiple electronic components disposed in an inner space 4001 defined by a side bezel structure 410 (e.g., a side member). According to an embodiment, the multiple electronic components may include a printed circuit board 420, multiple communication devices (e.g., a first communication device 441, a second communication device 442, a third communication device 443, and a fourth communication device 444) (e.g., an antenna structure or an antenna module), or a battery 430. According to an embodiment, the printed circuit board 420 may be disposed so as to avoid the battery 430 or the communication devices 441, 442, 443, and 444, or to partially overlap the battery 430 or the communication devices 441, 442, 443, and 444.

According to various embodiments, the electronic device 400 may include a conductive cable 4411 in order to electrically connect the printed circuit board 420 to the first communication device 441 spaced apart from the printed circuit board 420. According to an embodiment, the conductive cable 4411 may include a coaxial cable for reducing loss of an RF signal of the first communication device 441 and securing performance of the first communication device 441. In another embodiment, the conductive cable 4411 may include a flexible printed circuit board (FPCB). In another embodiment, the conductive cable 4411 may include a flexible printed circuit board (FRC) type RF cable. According to an embodiment, the electronic device 400 may include an electrical connection device 500 disposed in a connection portion between the conductive cable 4411 and the printed circuit board 420 so as to electrically connect the printed circuit board 420 and the first communication device 441 to each other. According to an embodiment, the electrical connection device 500 may include a receptacle (e.g., the receptacle 510 in FIG. 5) disposed on the printed circuit board 420 and the first communication device 441, and a connector (e.g., the connector 520 in FIG. 5) installed at one an end of the conductive cable 4411 to be electrically connected and detachably coupled to the receptacle (e.g., the receptacle 510 in FIG. 5). According to an embodiment, at least a portion of the receptacle (e.g., the receptacle 510 in FIG. 5) and at least a portion of the connector (e.g., the connector 520 in FIG. 5) are formed of a conductive material, and may be coupled by an operator when the electronic device 400 is assembled.

According to various embodiments of the disclosure, the electrical connection device 500 may be configured to block noise emitted from at least one of multiple conductive terminals and induced by peripheral terminals or peripheral electrical components. Moreover, it is possible to prevent a defect and a connection failure, which may occur during coupling of a receptacle (e.g., the receptacle 510 in FIG. 5) and a connector (e.g., the connector 520 in FIG. 5) using a structure of at least one conductive member for blocking noise.

Figure 5:
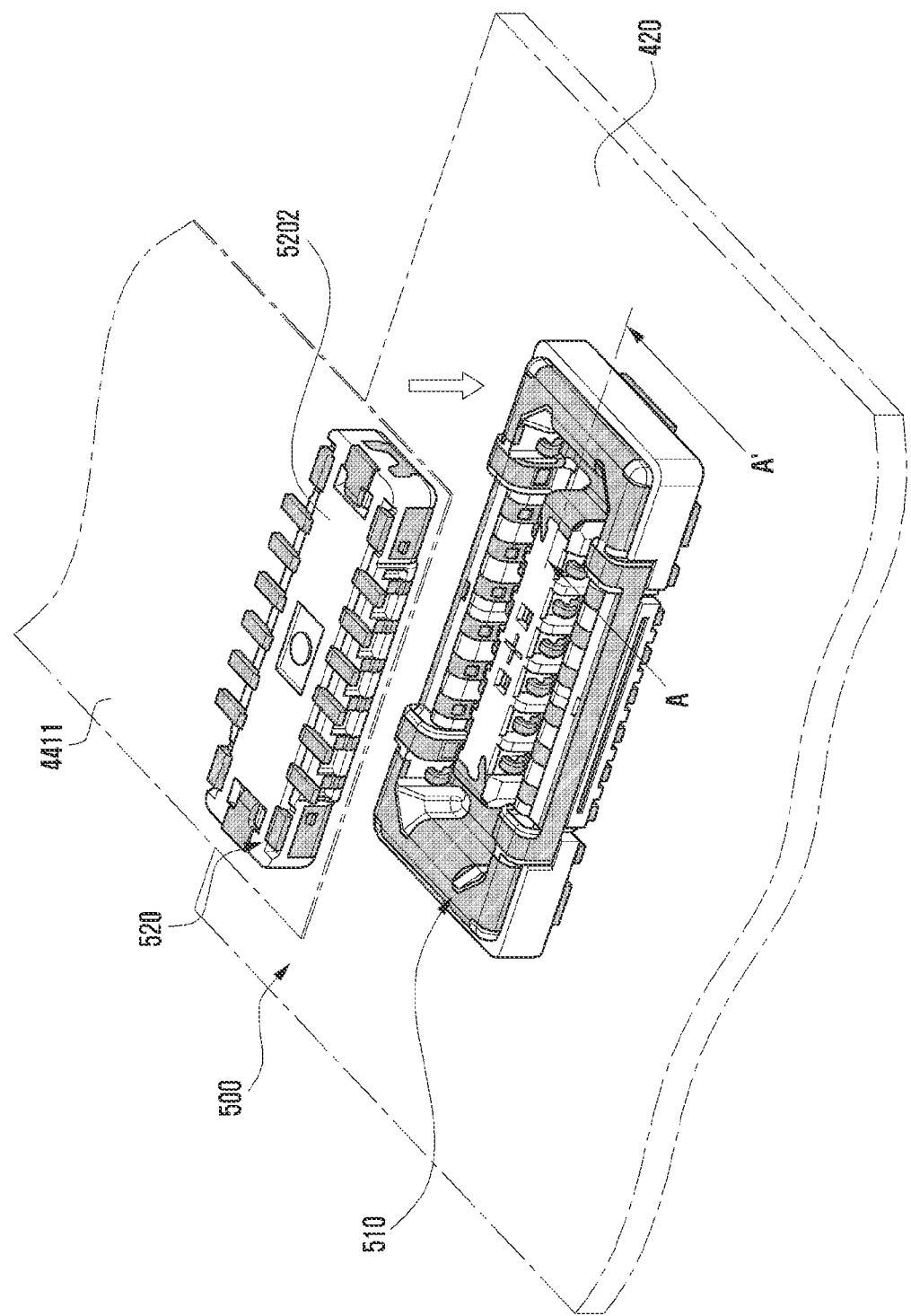
FIG. 5 is a perspective view illustrating the electrical connection device according to various embodiments of the disclosure in a disassembled state.

FIG. 5 is a perspective view illustrating the electrical connection device 500 according to various embodiments of the disclosure in a disassembled state.

Referring to FIG. 5, the electrical connection device 500 may include a receptacle 510 and a connector 520 electrically connected to the receptacle 510. According to an embodiment, the receptacle 510 may be mounted on the printed circuit board 420 disposed inside an electronic device (e.g., the electronic device 400 of FIG. 4). According to an embodiment, the connector 520 may be mounted at an end of a conductive cable (e.g., the conductive cable 4411 in FIG. 4) of a predetermined length drawn out from a communication device (e.g., the first communication device 441 in FIG. 4) disposed inside an electronic device (e.g., the electronic device 400 in FIG. 4). According to an embodiment, a communication device (e.g., the first communication device 441 in FIG. 4) may include at least one antenna radiator for 5G communication for transmitting a high-frequency signal. According to an embodiment, the electrical connection device 500 may have a coupling structure in which the receptacle 510 and the connector 520 may be physically coupled, and multiple conductive terminals may be disposed inside the coupling structure. The electrical connection device 500 can be electrically connected when a printed circuit board 420 and a communication device (e.g., the first communication device 441 in FIG. 4) in an electronic device (e.g., the electronic device 400 in FIG. 4) are disposed at appropriate positions to be spaced apart from each other and then the connector 520 is connected to the receptacle 510.

Figure 6A:
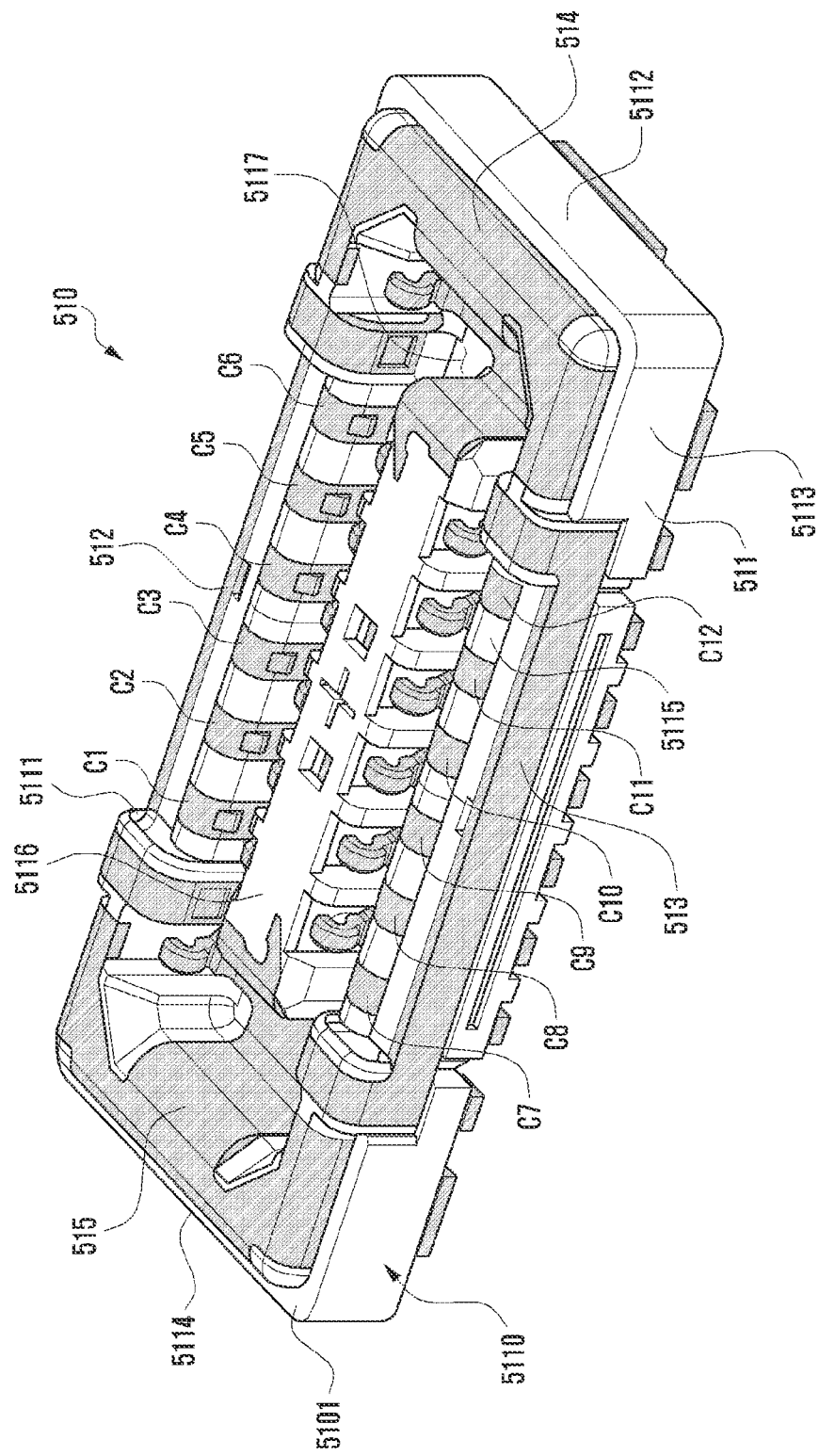
FIGS. 6A and 6B are views each illustrating the configuration of a receptacle according to various embodiments of the disclosure.
Figure 6B:
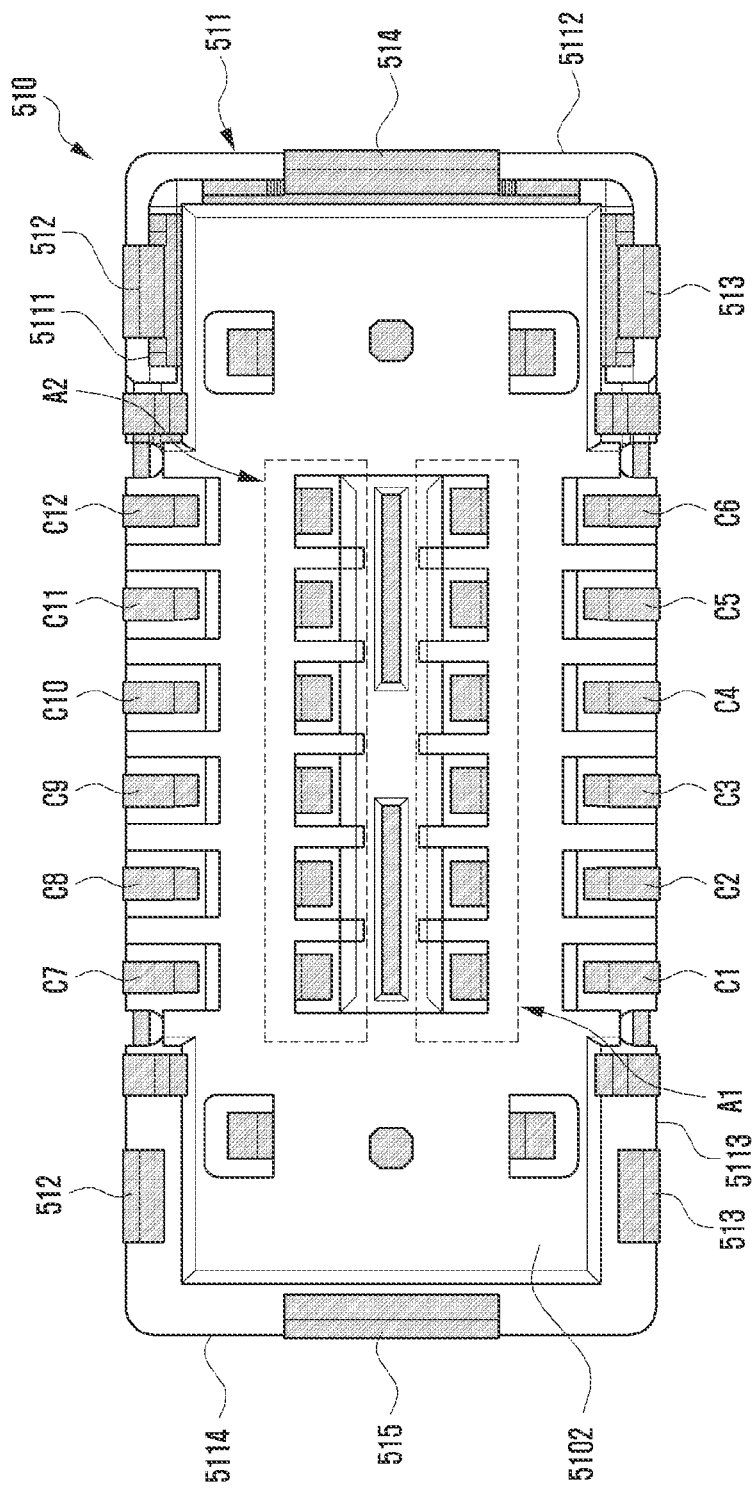

FIGS. 6A and 6B are views each illustrating the configuration of a receptacle 510 according to various embodiments of the disclosure.

Referring to FIGS. 6A and 6B, the receptacle 510 may include a base structure 5110 including a first surface 5101 facing away from a printed circuit board (e.g., the printed circuit board 420 in FIG. 5), a second surface 5102 facing away from the first surface 5101 and mounted on the printed circuit board (e.g., the printed circuit board 420 in FIG. 5), and a side surface 511 surrounding the space between the first surface 5101 and the second surface 5102. According to an embodiment, the base structure 5110 may be a mold structure capable of being fabricated through insert injection molding. According to an embodiment, the base structure 5110 may be made of an insulating material. According to an embodiment, the side surface 511 may include a first side surface 5111 having a first length, a second side surface 5112 extending in a vertical direction from the first side surface 5111 and having a second length shorter than the first length, a third side surface 5113 extending from the second side surface 5112 parallel to the first side surface 5111 and having the first length, and a fourth side surface 5114 extending from the third side surface 5113 parallel to the second side surface 5112 and having the second length. In another embodiment, when the base structure 5110 has a square shape, the first side surface 5111, the second side surface 5112, the third side surface 5113, and the fourth side surface 5114 may have the same length. In another embodiment, the base structure 5110 may have various shapes corresponding to the connection profile of the connector 520 to be electrically connected thereto. According to an embodiment, the base structure 5110 may include a recess 5117 having a predetermined depth from the first surface 5111 toward the second surface 5102. According to an embodiment, the base structure 5110 may include an edge area 5115 and an island area 5116 defined by the recess 5117.

According to various embodiments, the receptacle 510 may include multiple conductive terminals C1 to C12 disposed on the base structure 5110. According to an embodiment, the multiple conductive terminals C1 to C12 may include multiple first conductive terminals C1 to C6 arranged side by side in the longitudinal direction between the edge area 5115 around the first side surface 5111 and the island area 5116 and multiple second conductive terminals C7 to C12 arranged side by side in the longitudinal direction between the edge area 5115 around the third side surface 5113 and the island area 5116. According to an embodiment, at least one of the multiple conductive terminals C1 to C12 may be used for transmitting a high-frequency RF signal or a group of signals or for grounding a printed circuit board (e.g., the printed circuit board 420 in FIG. 5).

According to various embodiments, the receptacle 510 may include a conductive shielding structure disposed on the base structure 5110 so as to block transmission of noise induced from the conductive terminals C1 to C12 to the outside. According to an embodiment, the receptacle 510 may include multiple conductive members 512, 513, 514, and 515 disposed via the edge area 5115 to surround the island area 5116. According to an embodiment, the plurality of conductive members 512, 513, 514, and 515 may include a first conductive member 512 disposed between the first side surface 5111 and the edge area 5115, a second conductive area 513 disposed between the third side surface 5113 and the edge area 5115, a third conductive member 514 disposed up to at least a portion of the island area 5116 through the edge area 5115 around the second surface 5112 and the recess 5117, and a fourth conductive member 515 disposed up to at least a portion of the island area 5116 through the edge area 5115 around the fourth side surface 5114 and the recess 5117. According to an embodiment, the first conductive member 512, the second conductive member 513, the third conductive member 514, the fourth conductive member 515, the first conductive terminals C1 to C6, and the second conductive terminals C7 to C12 may be molded in the base structure 5110 through insert injection molding. According to an embodiment, the first conductive member 512, the second conductive member 513, the third conductive member 514, and the fourth conductive member 515 may be electrically connected to a ground of a printed circuit boards (e.g., the printed circuit board 420 in FIG. 5).

According to various embodiments, the first conductive member 512, the second conductive member 513, the third conductive member 514, and the fourth conductive member, which are arranged so as to surround the edge area 5115 in the base structure 5110, are capable of blocking noise induced from the first conductive terminals C1 to C6 and the second conductive terminals C7 to C12 and transmitted to the peripheral electrical elements disposed outside the receptacle 510. According to an embodiment, conductive portions extending to at least the island region 516 of the third conductive member 514 and the fourth conductive member 515 (e.g., a first conductive portion 5147 and a second conductive portion 5157 in FIG. 7) may be arranged so as to prevent mutual noise between a first region (area A1) in which the first conductive terminals C1 to C6 are disposed and a second area (area A2) in which the second conductive terminals C7 to C12 are disposed.

Figure 6C:
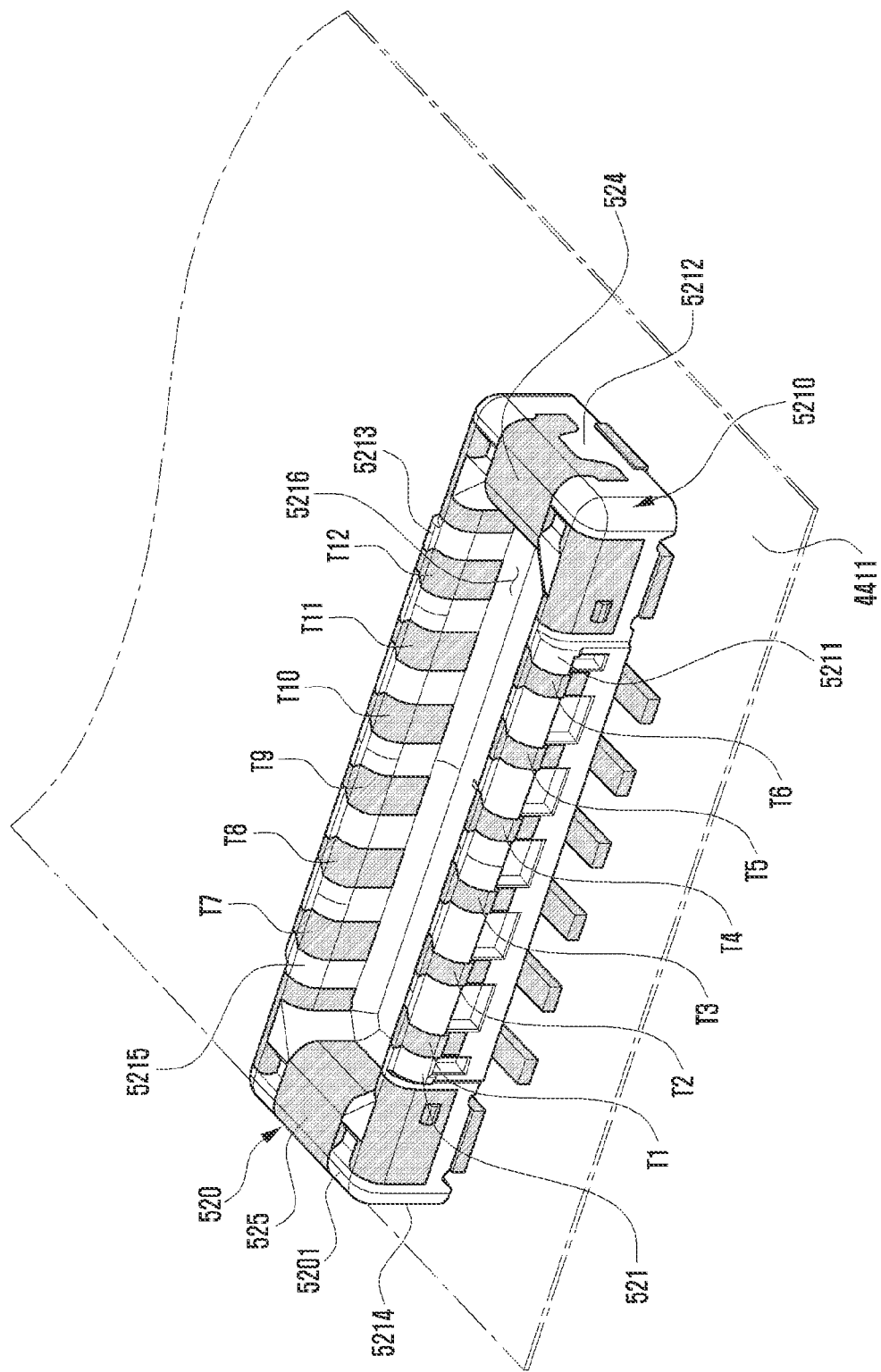
FIG. 6C is a perspective view illustrating a connector according to various embodiments of the disclosure, which is viewed from another direction.

FIG. 6C is a perspective view illustrating the connector 520 according to various embodiments of the disclosure, which is viewed from another direction.

Referring to FIG. 6C, the connector 520 may include a connector base 5210 including a first connector surface 5201 facing the receptacle 510, a second connector surface 5202 facing away from the receptacle 510, and a connector side surface 521 surrounding the first connector surface 5201 and the second connector surface 5202. According to an embodiment, the connector base 5210 may be a mold structure capable of being molded through insert injection molding. According to an embodiment, the connector base 5210 may be made of an insulating material. According to an embodiment, the connector side surface 521 may include a first connector side surface 5211 having a third length, a second connector side surface 5212 extending in a vertical direction from the first connector side surface 5211 and having a fourth length shorter than the third length, a third connector side surface 5213 extending from the second connector side surface 5212 parallel to the first connector side surface 5211 and having the third length, and a fourth side surface 5214 extending from the third connector side surface 5213 parallel to the second connector side surface 5212 and having the fourth length. According to an embodiment, the connector base 5210 may include an island seating portion 5216 having a predetermined depth from the first connector surface 5201 toward the second connector surface 5202. According to an embodiment, the connector 520 may include an edge area 5215 defined by the island seating portion 5216. According to an embodiment, the connector 520 may include multiple first connector terminals T1 to T6 sequentially arranged through the first connector side surface 5211 and the edge area 5215, and multiple second connector terminals T7 to T12 sequentially arranged through the third connector side surface 5213 and the edge area 5215. Accordingly, when the connector 520 is connected to the receptacle (e.g., the receptacle 510 in FIG. 6A), the island area of the receptacle (e.g., the island area 5116 in FIG. 6A) is seated on the island seating portion 5216 of the connector 520, and the edge area 5215 of the connector 520 may be coupled to be seated in the recess (e.g., the recess 5117 in FIG. 6A) of the receptacle (e.g., the receptacle 510 in FIG. 6A). At the same time, the first conductive terminals C1 to C6 and the second conductive terminals C7 to C12 of the receptacle 510 may be electrically connected to the first connector terminals T1 to T6 and the second connector terminals T7 to T12 of the connector 520 by being in physical contact with the first connector terminals T1 to T6 and the second connector terminals T7 to T12.

According to various embodiments, the connector 520 may include a fifth conductive member 524 disposed to be exposed through the second connector side surface 5212 of the connector base 5210 and a sixth conductive member 525 disposed to be exposed through the fourth connector side surface 5214. According to an embodiment, when the connector 520 is coupled to a receptacle (e.g., the receptacle 510 in FIG. 6A), the fifth conductive member 524 may be brought into physical contact with the third conductive member (e.g., the third conductive member 514 in FIG. 6A) arranged in the receptacle (e.g., the receptacle 510 in FIG. 6A), and the sixth conductive member 525 may be brought into physical contact with the fourth conductive member (e.g., the fourth conductive member 515 in FIG. 6A) arranged in the receptacle (e.g., the receptacle 510 in FIG. 6A).

According to various embodiments, the fifth conductive member 524, the sixth conductive member 525, the first connector terminals T1 to T6, and the second connector terminals T7 to T12 may be molded in the connector base 5210 through insert injection molding. According to an embodiment, in the state in which the connector 520 is coupled to a receptacle (e.g., the receptacle 510 of FIG. 6A), the fifth conductive member 524 and the sixth conductive member 525 may be electrically connected to a ground of a printed circuit board (e.g., the printed circuit board 420 in FIG. 5A) via the third conductive member (e.g., the third conductive member 514 in FIG. 6A) and the fourth conductive member (e.g., the fourth conductive member 515 in FIG. 6A).

Figure 7:
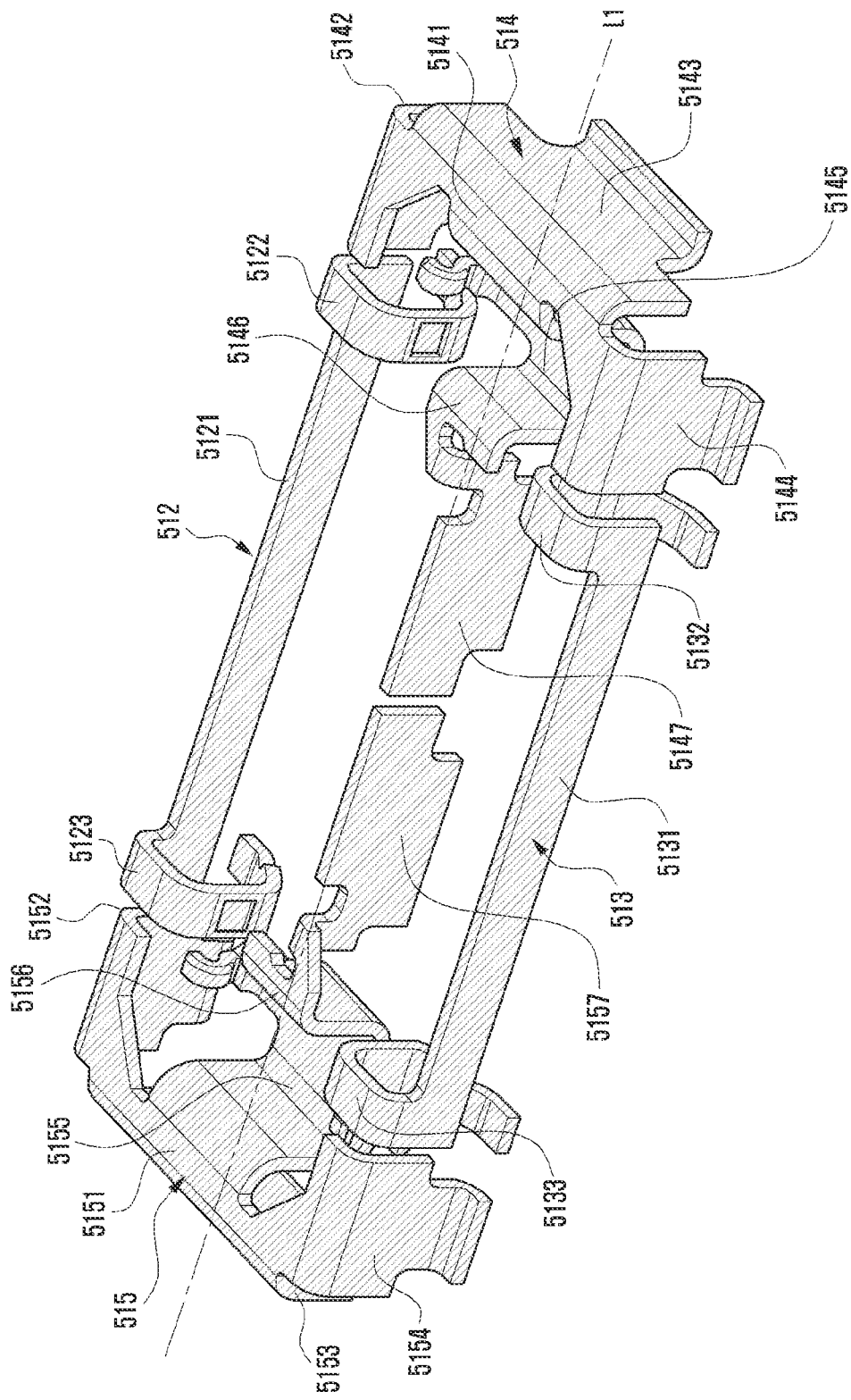
FIG. 7 is a view illustrating an arrangement relationship of conductive members applied to a receptacle according to various embodiments of the disclosure.

FIG. 7 is a view illustrating an arrangement relationship of conductive members 512, 513, 514, and 515 applied to a receptacle (e.g., the receptacle 510 in FIG. 6A) according to various embodiments of the disclosure.

Referring to FIG. 7, the first conductive member 512 and the second conductive member 513 may have symmetrical shapes with respect to each other. As another embodiment, the first conductive member 512 and the second conductive member 513 may have asymmetrical shapes with respect to each other. According to an embodiment, the first conductive member 512 may include a first conductive rib 5121 arranged in a longitudinal direction along the first side surface (e.g., the first side surface 5111 in FIG. 6A) of the base member (e.g., the base member 5110 in FIG. 6A), a first conductive fixing portion 5122 extending from one end of the first conductive rib 5121 to the edge area (e.g., the edge area 511 in FIG. 6A and at least a portion of the recess (e.g., the recess 5117 in FIG. 6A), and a second conductive fixing portion 5123 extending from the other end of the first conductive rib 5121 to the edge area (e.g., the edge area 5115 in FIG. 6A) and at least a portion of the recess (e.g., the recess 5117 in FIG. 6A).

According to various embodiments, the second conductive member 513 may include a second conductive rib 5131 arranged in a longitudinal direction along the third side surface (e.g., the third side surface 5113 in FIG. 6A) of the base member (e.g., the base member 5110 in FIG. 6A), a third conductive fixing portion 5132 extending from one end of the second conductive rib 5131 to the edge area (e.g., the edge area 5115 in FIG. 6A) and at least a portion of the recess (e.g., the recess 5117 in FIG. 6A), and a fourth conductive fixing portion 5133 extending from the other end of the second conductive rib 5131 to the edge area (e.g., the edge area 5115 in FIG. 6A) and at least a portion of the recess (e.g., the recess 5117 in FIG. 6A).

According to various embodiments, the first conductive member 512 is capable of preventing noise emitted from the multiple first conductive terminals (e.g., the conductive terminals C1 to C6 in FIG. 6A) from being exposed through the first side surface (e.g., the first side surface 5111 in FIG. 6A). The second conductive member 513 is capable of preventing noise emitted from the multiple second conductive terminals (e.g., the second conductive terminals C7 to C12 in FIG. 6A) from being exposed through the third side surface (e.g., the third side surface 5113 in FIG. 6A).

According to various embodiments, the third conductive member 514 and the fourth conductive member 515 may have symmetrical shapes with respect to each other. As another embodiment, the third conductive member 514 and the fourth conductive member 515 may have asymmetrical shapes with respect to each other. According to an embodiment, the third conductive member 514 may include a first plate portion 5141 disposed in the edge area (e.g., the edge area 5115 in FIG. 6A) near the second side surface (e.g., the second side surface 5112 in FIG. 6A) of the base member (e.g., the base member 5110 in FIG. 6A), a first conductive extension portion 5142 extending from the first plate portion 5141 to the third side surface (e.g., the third side surface 5113 in FIG. 6A), a second conductive extension portion 5143 extending from the first plate portion 5141 to the second side surface (e.g., the second side surface 5112 in FIG. 6A), a third conductive extension portion 5144 extending from the first plate portion 5141 to the first side surface (e.g., the first side surface 5111 in FIG. 6A), a first seating portion 5145 to be seated in the recess (e.g., the recess 5117 in FIG. 6A) in the first plate portion 5141, a first protrusion 5146 protruding from the first seating portion 5145 to the island area (e.g., the island area 5116 in FIG. 6A), and a first conductive portion 5147 extending from the first protrusion 5146 toward the fourth conductive member 515. According to an embodiment, the plate portion 5141, the first conductive extension portion 5142, the second conductive extension portion 5143, the third conductive extension portion 5144, the first seating portion 5145, the first protrusion 5146, and the first conductive portion 5147 may be integrally formed of a metal material.

According to various embodiments, the fourth conductive member 515 may include a second plate portion 5151 disposed in the edge area (e.g., the edge area 5115 in FIG. 6A) near the fourth side surface (e.g., the fourth side surface 5114 in FIG. 6A) of the base member (e.g., the base member 5110 in FIG. 6A), a fourth conductive extension portion 5152 extending from the first plate portion 5151 to the third side surface (e.g., the third side surface 5113 in FIG. 6A), a fifth conductive extension portion 5153 extending from the second plate portion 5151 to the fourth side surface (e.g., the fourth side surface 5114 in FIG. 6A), a sixth conductive extension portion 5154 extending from the second plate portion 5151 to the first side surface (e.g., the first side surface 5111 in FIG. 6A), a second seating portion 5155 to be seated in the recess (e.g., the recess 5117 in FIG. 6A) in the second plate portion 5151, a second protrusion 5156 protruding from the second seating portion 5155 to the island area (e.g., the island area 5116 in FIG. 6A), and a second conductive portion 5157 extending from the second protrusion 5156 toward the third conductive member 514. According to an embodiment, the plate portion 5151, the fourth conductive extension portion 5152, the fifth conductive extension portion 5153, the sixth conductive extension portion 5154, the second seating portion 5155, the second protrusion 5156, and the second conductive portion 5157 may be integrally formed of a metal material.

According to various embodiments, since the conductive shielding structure according to the disclosure includes the first conductive member 512, the second conductive member 513, the third conductive member 514, and the fourth conductive member 515, which are arranged to surround the first conductive terminals (e.g., the first conductive terminals C1 to C6 in FIG. 6A) and the second conductive terminals (e.g., the second conductive terminals C7 to C12 in FIG. 6A) along the edge area (e.g., the edge area 5115 in FIG. 6A) in the base structure (e.g., the base structure 5110 in FIG. 6A), noise emitted from the first conductive terminals (e.g., the first conductive terminals C1 to C6 in FIG. 6A) and the second conductive terminals (e.g., the second conductive terminals C7 to C12 in FIG. 6A) can be blocked such that the noise is not transmitted to the outside.

According to various embodiments, the first area (e.g., the first area (area A1) in FIG. 6A) in which the first conductive terminals (e.g., the first conductive terminals C1 to C6 in FIG. 6A) are arranged and the second area (e.g., the second area (area A2) in FIG. 6A) in where the second conductive terminals (e.g., the second conductive terminals C7 to C12 in FIG. 6A) are arranged can also be effectively shielded from each other. For example, the first conductive portion 5147 extending from the third conductive member 514 toward the fourth conductive member 515 and the second conductive portion 5157 extending from the fourth conductive member 515 toward the third conductive member 514 may be arranged close to each other on the same first line L1. According to an embodiment, the first conductive portion 5147 and the second conductive portion 5157 may be arranged to have a capacitively coupled separation distance in order to increase shielding efficiency. In another embodiment, the first conductive portion 5147 and the second conductive portion 5157 may be arranged such that the ends thereof are in contact with each other on the first line L1. In this case, the first area (e.g., the first area (area A1) in FIG. 6A) and the second area (e.g., the second area (area A2) in FIG. 6A) may be arranged to be shielded from each other by the connection structure between the first conductive portion 5147 and the second conductive portion 5157.

Figure 8:
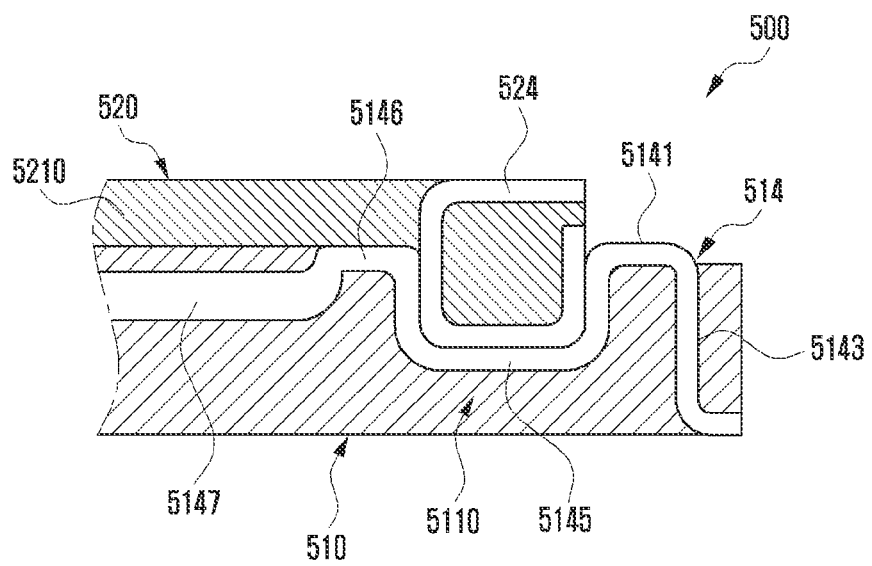
FIG. 8 is a cross-sectional view of a main part taken along line A-A' in FIG. 5 in the state in which the electrical connection device according to various embodiments of the disclosure is connected.

FIG. 8 is a cross-sectional view of a main part taken along line A-A' in FIG. 5 in the state in which the electrical connection device 500 according to various embodiments of the disclosure is connected.

Referring to FIG. 8, the third conductive member 524 may include a first seating portion 5145 so as to ensure that the fifth conductive member 524 is brought into contact with and seated in the first seating portion 5145 when the connector 520 is coupled to the receptacle 510. Therefore, when the connector 520 is coupled with the receptacle 510, the fifth conductive member 524, which is exposed to the edge area (e.g., the edge area 5215 in FIG. 6C) near the second connector side surface (e.g., the second connector side surface 5212 in FIG. 6C) of the connector base 5210, may be seated on the first seating portion 5145 of the third conductive member 514 exposed to the recess (e.g., the recess 5117 in FIG. 6A) near the second side surface (e.g., the second side surface 5112 in FIG. 6A) of the base structure 5110 of the receptacle 510. Therefore, in the contact area between when the connector base and the base member when the receptacle 510 and the connector 520 are coupled to each other, the existing mold material is replaced with a conductive metal member so that the stiffness of the contact area can be reinforced to prevent crushing or breakage of the contact area. Likewise, when the receptacle 510 and the connector 520 are coupled to each other, the sixth conductive member 525 exposed to the edge area 5215 near the fourth connector side surface 5214 (e.g., the fourth connector side surface 5214 in FIG. 6C) of the connector base 5210 of the connector 520 is also capable of being seated on the second seating portion (e.g., the second seating portion 5155 in FIG. 7) of the fourth conductive member 515 exposed to the recess 5117 near the fourth side surface (e.g., the fourth side surface 5114 in FIG. 6A) of the base structure 5110 of the receptacle 510.

According to various embodiments, it is possible to implement a shielding structure between terminals in the electrical connection device 500. For example, as illustrated in FIG. 6B, when the terminal C3 contributes as a terminal for transmitting a high-frequency RF signal, the terminals C2 and C4, which are peripheral terminals of the terminal C3, can be electrically connected a ground on a printed circuit board (e.g., the printed circuit board 420 in FIG. 5). Accordingly, the terminal C3 may be arranged such that all sides thereof can be shielded by the terminal C2, the terminal C4, the first conductive portion (the first conductive portion 5147 in FIG. 7), the second conductive portion (the second conductive portion 5157 in FIG. 7), and the first conductive member 512.

Figure 9A:
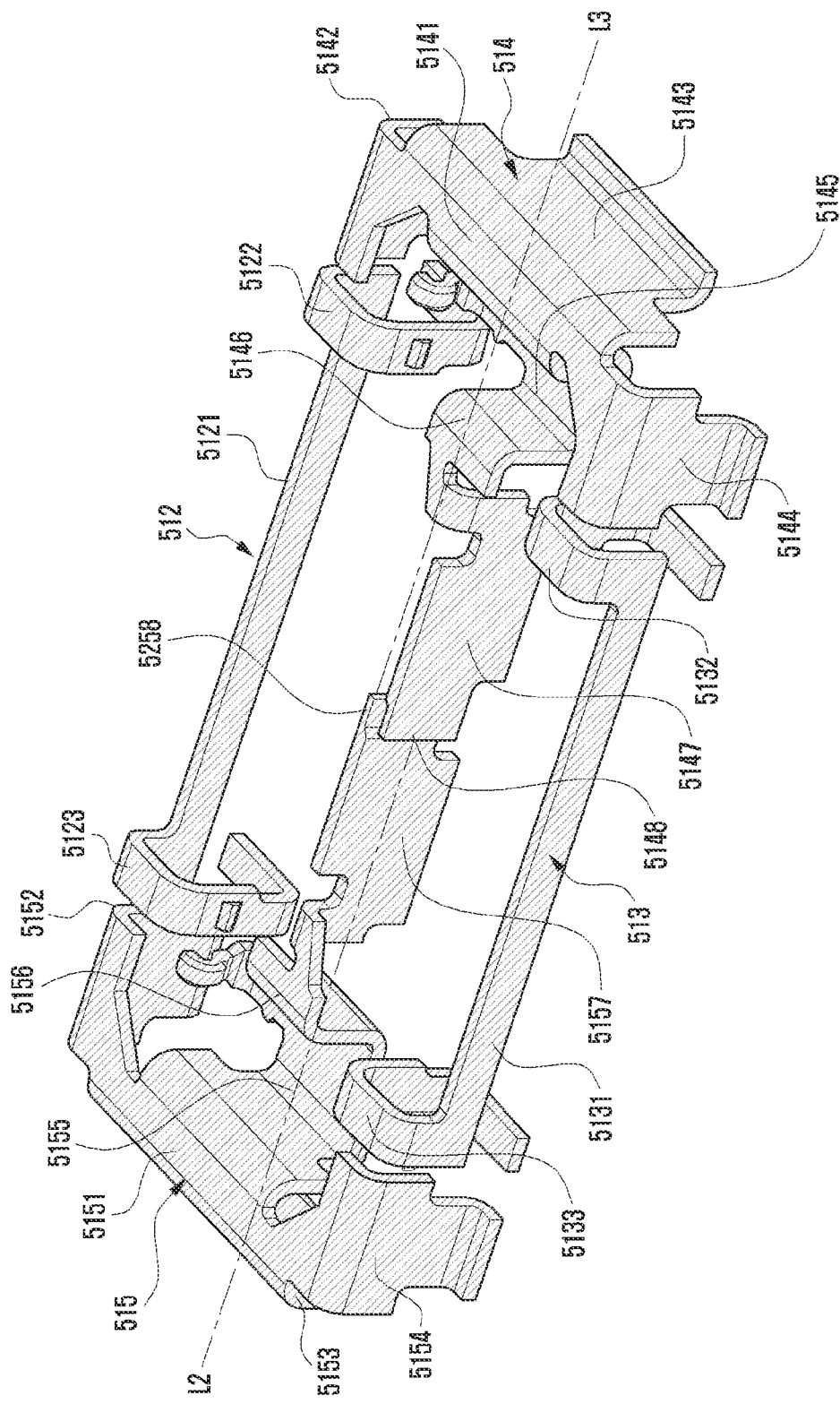
FIGS. 9A and 9B are views each illustrating an arrangement relationship of conductive members applied to a receptacle according to various embodiments of the disclosure.
Figure 9B:
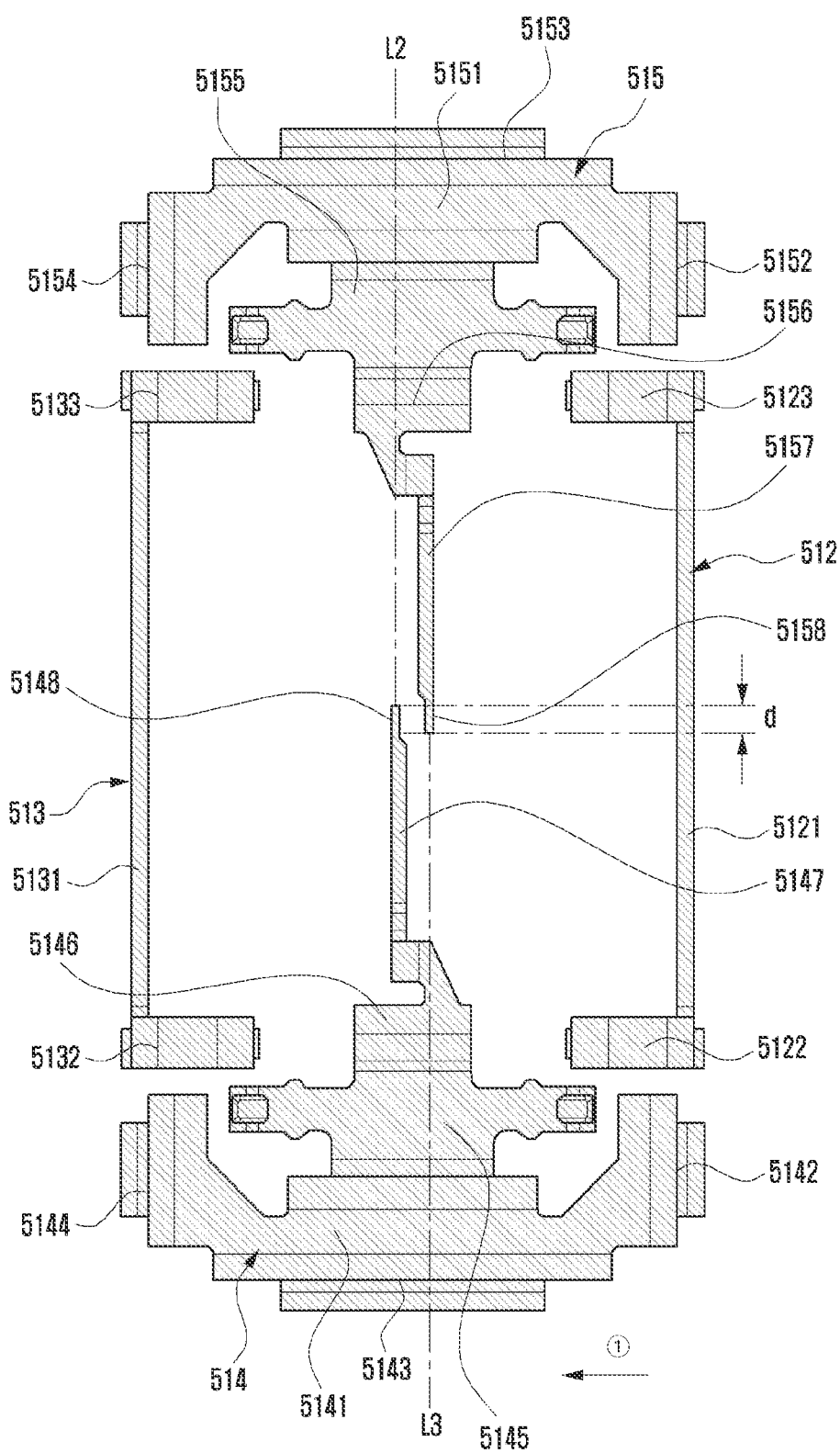

FIGS. 9A and 9B are views each illustrating an arrangement relationship of conductive members 512, 513, 514, and 515 applied to a receptacle according to various embodiments of the disclosure.

Referring to FIGS. 9A and 9B, the first area (e.g., the first area (area A1) in FIG. 6B) in which the first conductive terminals (e.g., the first conductive terminals C1 to C6 in FIG. 6B) are arranged and the second area (e.g., the second area (area A2) in FIG. 6B) in where the second conductive terminals (e.g., the second conductive terminals C7 to C12 in FIG. 6B) are arranged can be shielded from each other. For example, the first conductive portion 5147 extending from the third conductive member 514 toward the fourth conductive member 515 may be disposed on the second line L2. According to an embodiment, the second conductive portion 5157 extending from the fourth conductive member 515 toward the third conductive member 514 may be disposed on a third line L3 different from the second line L2. According to an embodiment, the second line L2 and the third line L3 may be arranged substantially parallel to each other. In another embodiment, the second line L2 and the third line L3 may be arranged not parallel to each other. According to an embodiment, the end 5148 of the first conductive portion 5147 and the end 5158 of the second conductive portion 5157 may be arranged to have an overlapping portion d of a predetermined length when the third side surface (e.g., the third side surface 5113 in FIG. 6A) is viewed from the first side surface (e.g., the first side surface 5111 in FIG. 6A) of the base member (e.g., the base member 5110 in FIG. 6A). According to an embodiment, the overlapping portion d may be about 0.1 mm. In another embodiment, the overlapping portion d may be determined depending on the size or shape of the receptacle. In this case, thanks to the overlapping area d between the first conductive portion 5147 and the second conductive portion 5157, the first area (e.g., the first area (area A1) in FIG. 6B) and the second area (e.g., the second area (area A2) in FIG. 6B) can be more effectively shielded from each other.

According to various embodiments, among the above-described multiple first conductive terminals (e.g., the multiple first conductive terminals C1 to C6 in FIG. 6A) and/or the multiple second conductive terminals (e.g., the multiple second conductive terminals C7 to C12 in FIG. 6A), at least one terminal may transmit a radio frequency signal in the range of about 10 GHz to about 100 GHz.

According to various embodiments, the third conductive member 514 and the fourth conductive member 515 may be integrally formed, and in this case, only one of the two conductive members 514 and 515 may be electrically connected to a ground of a printed circuit board (e.g., the printed circuit board 420 in FIG. 5).

Figure 10:
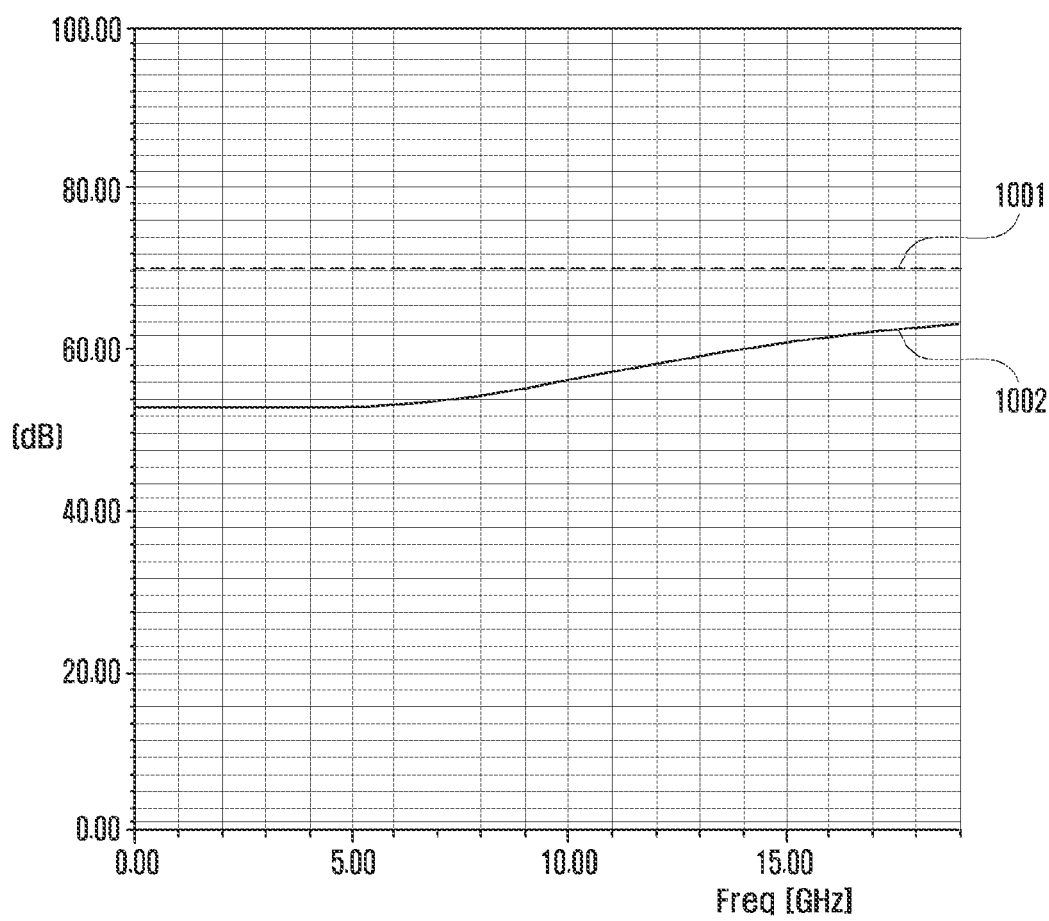
FIG. 10 is a graph showing the shielding performance of an electrical connection device before and after application of conductive members according to various embodiments of the disclosure in comparison.

FIG. 10 is a graph showing the shielding performance of an electrical connection device (e.g., the electrical connection device 500 in FIG. 5) before and after application of conductive members (e.g., the conductive members 512, 513, 514, and 515 in FIG. 6A) according to various embodiments of the disclosure in comparison. When conductive members (e.g., the conductive members 512, 513, 514, and 515 in FIG. 6A) are not arranged in the receptacle (e.g., the receptacle 510 in FIG. 6A), shielding performance of about 70 dB is exhibited (graph 1001), but when conductive members (e.g., the conductive members 512, 513, 514, and 515 in FIG. 6A) are arranged, shielding performance of 70 dB or less is exhibited even in the high-frequency band (graph 1002). Thus, it can be seen that when conductive members (e.g., the conductive members 512, 513, 514, and 515 in FIG. 6A) are applied, the electrical connection device (e.g., the electrical connection device 500 in FIG. 5) exhibits more excellent shielding performance.

According to various embodiments, an electronic device (e.g., the electronic device 400 in FIG. 4) may include a housing (e.g., the side bezel structure 410 in FIG. 4), a printed circuit board (PCB) (e.g., the printed circuit board 420 in FIG. 4) disposed inside the housing, a receptacle (e.g., the receptacle 510 in FIG. 6A) mounted on the printed circuit board, and a connector (e.g., the connector 520 in FIG. 6C) removably coupled to the receptacle. The receptacle may include a base structure (e.g., the base structure 5110 in FIG. 6A) including a first surface (e.g., the first surface 5101 in FIG. 6A) facing away from the printed circuit board, a second surface (e.g., the second surface 5102 in FIG. 6B) facing away from the first surface and mounted on the printed circuit board, and a side surface (e.g., the side surface 511 in FIG. 6A) surrounding the space between the first surface and the second surface. The side surface may include a first side surface (e.g., the first side surface 5111 in FIG. 6A), a second side surface (e.g., the second side surface 5112 in FIG. 6A) extending from the first side surface in a vertical direction, a third side surface (e.g., the third side surface 5113 in FIG. 6A) extending from the second side surface in a direction parallel to the first side surface, and a fourth side surface (e.g., the fourth side surface 5114 in FIG. 6A) extending from the third side surface in a direction parallel to the second side surface. The base structure may include an edge area (e.g., the edge area 5115 in FIG. 6A) and an island area (e.g., the island area 5116 in FIG. 6A) defined by a recess (e.g., the recess 5117 in FIG. 6A) having a predetermined depth from the first surface toward the second surface. The receptacle may further include multiple first conductive terminals (e.g., the first conductive terminals C1 to C6 in FIG. 6A) arranged side by side between the edge area and the island area along at least a portion of the first side surface, multiple second conductive terminals (e.g., the second conductive terminals C7 to C12 in FIG. 6A) arranged side by side between the edge area and the island area along at least a portion of the third side surface, a first conductive member (e.g., the first conductive member 512 in FIG. 6A) disposed on the first side surface, a second conductive member (e.g., the second conductive member 513 in FIG. 6A) disposed on the third side surface, a third conductive member (e.g., the third conductive member 514 in FIG. 6A) disposed from a periphery of the second side surface to at least a portion of the island area, and a fourth conductive member (e.g., the fourth conductive member 515 in FIG. 6A) disposed from a periphery of the fourth side surface to at least a portion of the island area. The connector may include a connector base (e.g., the connector base 5210 in FIG. 6C) including a first connector surface (e.g., the first connector surface 5201 in FIG. 6C) facing the first surface of the receptacle and a second connector surface (e.g., the second connector surface 5202 in FIG. 6A) facing away from the first connector surface, a connector edge area (e.g., the connector edge area 5215 in FIG. 6C) including an island seating portion (e.g., the island seating portion 5216 in FIG. 6C) seated in the recess, and multiple connector terminals (e.g., the multiple connector terminals T1 to T12 in FIG. 6C) disposed at positions corresponding to the first conductive terminals and the second conductive terminals in the connector edge area.

According to various embodiments, the first conductive terminals, the second conductive terminals, the first conductive member, the second conductive member, the third conductive member, and the fourth conductive member may be molded in the base structure through insert injection molding.

According to various embodiments, at least a portion of each of the first conductive member, the second conductive member, the third conductive member, and the fourth conductive member may be exposed through the second surface of the base structure, and the exposed portion may be electrically connected to a ground of the printed circuit board.

According to various embodiments, the at least a portion of the third conductive member (e.g., the third conductive member 514 in FIG. 7) and the at least a portion of the fourth conductive member (e.g., the fourth conductive member 515 in FIG. 7) may be arranged so as to be at least partially close to or overlap each other when viewed in a direction from the first side surface toward the third side surface.

According to various embodiments, the first conductive portion and the second conductive portion may be arranged substantially parallel to a first line (e.g., the first line L1 in FIG. 7) extending across the island area.

According to various embodiments, the first conductive portion and the second conductive portion may be arranged to be spaced apart from each other by a specified interval.

According to various embodiments, an end portion of the first conductive member and an end portion of the second conductive member may be arranged so as to at least partially overlap each other when viewed in the direction from the first side surface toward the third side surface.

According to various embodiments, the first conductive member (e.g., the first conductive member 512 in FIG. 7) may include a first conductive rib (e.g., the first conductive rib 5121 in FIG. 7) disposed in the longitudinal direction of the first side surface, a first conductive fixing portion (e.g., the first conductive fixing portion 5122 in FIG. 7) disposed at one end of the first conductive rib near the third conductive member (e.g., the third conductive member 514 in FIG. 7), and a second conductive fixing portion (e.g., the second conductive fixing portion 5123 in FIG. 7) disposed at the other end of the first conductive rib near the fourth conductive member (e.g., the fourth conductive member 515 in FIG. 7).

According to various embodiments, the second conductive member (e.g., the second conductive member 513 in FIG. 7) may include a second conductive rib (e.g., the second conductive rib 5131 in FIG. 7) disposed in the longitudinal direction of the third side surface, a third conductive fixing portion (e.g., the third conductive fixing portion 5132 in FIG. 7) disposed at one end of the second conductive rib near the third conductive member (e.g., the third conductive member 514 in FIG. 7), and a fourth conductive fixing portion (e.g., the fourth conductive fixing portion 5133 in FIG. 7) disposed at the other end of the second conductive rib near the fourth conductive member (e.g., the fourth conductive member 515 in FIG. 7).

According to various embodiments, the third conductive member (e.g., the third conductive member 514 in FIG. 7)

may include a first plate portion (e.g., the first plate portion 5141 in FIG. 7) disposed in a portion of the base structure, a first conductive extension portion (e.g., the first conductive extension portion 5142 in FIG. 7) extending from the first plate portion to the first side surface near the first conductive member, a second conductive extension portion (the second conductive extension portion 5143 in FIG. 7) extending from the first plate portion to the second side surface, a third conductive extension portion (e.g., the third conductive extension portion 5144 in FIG. 7) extending from the first plate portion to the third side surface near the second conductive member, a first seating portion (e.g., the first seating portion 5145 in FIG. 7) extending from the first plate portion to the recess, a first protrusion (e.g., the first protrusion 5146 in FIG. 7) exposed from the first seating portion to at least a portion of the island area, and a first conductive portion (e.g., the first conductive portion 5147 in FIG. 7) extending from the first protrusion toward the fourth conductive member in the island area.

According to various embodiments, the connector (e.g., the connector 520 in FIG. 6C) may include a fifth conductive member (e.g., the fifth conductive member 524 in FIG. 6C) disposed in a portion of the connector edge area (e.g., the connector edge area 5215 in FIG. 6C) to be exposed, and the fifth conductive member may be seated on the first seating portion in a state in which the connector is coupled to the receptacle.

According to various embodiments, the fourth conductive member (e.g., the fourth conductive member 515 in FIG. 7) may include a second plate portion (e.g., the second plate portion 5151 in FIG. 7) disposed in a portion of the base structure, a fourth conductive extension portion (e.g., the fourth conductive extension portion 5152 in FIG. 7) extending from the second plate portion to the first side surface near the first conductive member, a fifth conductive extension portion (the fifth conductive extension portion 5153 in FIG. 7) extending from the second plate portion to the fourth side surface, a sixth conductive extension portion (e.g., the sixth conductive extension portion 5154 in FIG. 7) extending from the second plate portion to the third side surface near the second conductive member, a second seating portion (e.g., the second seating portion 5155 in FIG. 7) extending from the second plate portion to the recess, a second protrusion (e.g., the second protrusion 5156 in FIG. 7) exposed from the second seating portion to at least a portion of the island area, and a second conductive portion (e.g., the second conductive portion 5157 in FIG. 7) extending from the second protrusion toward the third conductive member in the island area.

According to various embodiments, the connector may include a sixth conductive member (e.g., the sixth conductive member 525 in FIG. 6C) disposed in a portion of the connector edge area to be exposed, and the sixth conductive member may be seated on the second seating portion in the state in which the connector is coupled to the receptacle.

According to various embodiments, at least one of the multiple first conductive terminals and/or at least one of the multiple second conductive terminals may transmit a radio-frequency signal in a range of 10 GHz to 100 GHz.

According to various embodiments, the electronic device may further include a display (e.g., the display 330 in FIG. 3) disposed to be visible from the outside through at least a partial area of the housing.

According to various embodiments, a receptacle (e.g., the receptacle 510 in FIG. 5) configured to be coupled with a connector (e.g., the connector 520 in FIG. 5) may include a base structure (e.g., the base structure 5110 in FIG. 6A) including a first surface (e.g., the first surface 5101 in FIG. 6A), a second surface (e.g., the second surface 5102 in FIG. 6B) facing away from the first surface and mounted on the printed circuit board, and a side surface (e.g., the side surface 511 in FIG. 6A) surrounding the space between the first surface and the second surface. The side surface may include a first side surface (e.g., the first side surface 5111 in FIG. 6A), a second side surface (e.g., the second side surface 5112 in FIG. 6A) extending from the first side surface in a vertical direction, a third side surface (e.g., the third side surface 5113 in FIG. 6A) extending from the second side surface in a direction parallel to the first side surface, and a fourth side surface (e.g., the fourth side surface 5114 in FIG. 6A) extending from the third side surface in a direction parallel to the second side surface. The base structure may include an edge area (e.g., the edge area 5115 in FIG. 6A) and an island area (e.g., the island area 5116 in FIG. 6A) defined by a recess (e.g., the recess 5117 in FIG. 6A) having a predetermined depth from the first surface toward the second surface. The receptacle may further include multiple first conductive terminals (e.g., the first conductive terminals C1 to C6 in FIG. 6A) arranged side by side between the edge area and the island area along at least a portion of the first side surface, multiple second conductive terminals (e.g., the second conductive terminals C7 to C12 in FIG. 6A) arranged side by side between the edge area and the island area along at least a portion of the third side surface, a first conductive member (e.g., the first conductive member 512 in FIG. 6A) disposed on the first side surface, a second conductive member (e.g., the second conductive member 513 in FIG. 6A) disposed on the third side surface, a third conductive member (e.g., the third conductive member 514 in FIG. 6A) disposed from a periphery of the second side surface to at least a portion of the island area, and a fourth conductive member (e.g., the fourth conductive member 515 in FIG. 6A) disposed from a periphery of the fourth side surface to at least a portion of the island area.

According to various embodiments, at least a portion of each of the first conductive member, the second conductive member, the third conductive member, and the fourth conductive member may be exposed through the second surface of the base structure, and the exposed portion may be electrically connected to a ground of the printed circuit board.

According to various embodiments, the at least a portion of the third conductive member and the at least a portion of the fourth conductive member may be arranged so as to be at least partially close to or overlap each other when viewed in a direction from the first side surface toward the third side surface.

According to various embodiments, the first conductive portion may be arranged substantially parallel to a first line (e.g., the second line L2 in FIG. 9A) extending across the island area, and the second conductive portion may be arranged substantially parallel to a second line (e.g., the third line L3 in FIG. 9A) extending across the island area at a position different from that of the first line.

According to various embodiments, an end portion of the first conductive portion and an end portion of the second conductive portion may be arranged so as to at least partially overlap each other when viewed in the direction from the first side surface toward the third side surface.

Various embodiments of the disclosure disclosed in this specification and drawings are provided merely to easily describe the technical contents of the disclosure and to help understanding of the embodiments of the disclosure, and are not intended to limit the scope of the disclosure. Accordingly, the scope of the various embodiments should be construed in such a manner that, in addition to the embodiments disclosed herein, all changes or modifications derived from the technical idea of the various embodiments are included in the scope of the various embodiments.

The invention claimed is:

1. An electronic device comprising:
   a housing;
   a printed circuit board (PCB) disposed inside the housing;
   a receptacle mounted on the printed circuit board, the receptacle comprising:
      a base structure comprising a first surface facing away from the printed circuit board, a second surface facing away from the first surface and mounted on the printed circuit board, and a side surface surrounding a space between the first surface and the second surface, wherein the side surface comprises a first side surface, a second side surface extending from the first side surface in a vertical direction, a third side surface extending from the second side surface in a direction parallel to the first side surface, and a fourth side surface extending from the third side surface in a direction parallel to the second side surface, and wherein the base structure comprises an edge area and an island area defined by a recess having a predetermined depth from the first surface toward the second surface;
      multiple first conductive terminals arranged side by side between the edge area and the island area along at least a portion of the first side surface;
      multiple second conductive terminals arranged side by side between the edge area and the island area along at least a portion of the third side surface;
      a first conductive member disposed on the first side surface;
      a second conductive member disposed on the third side surface;
      a third conductive member disposed from a periphery of the second side surface to at least a portion of the island area; and
      a fourth conductive member disposed from a periphery of the fourth side surface to at least a portion of the island area; and
   a connector removably coupled to the receptacle, the connector comprising:
      a connector base comprising a first connector surface facing the first surface of the receptacle and a second connector surface facing away from the first connector surface;
      a connector edge area comprising an island seating portion seated in the recess; and
      multiple connector terminals disposed at positions corresponding to the first conductive terminals and the second conductive terminals in the connector edge area,
   wherein the third conductive member comprises a first conductive portion extending from at least a portion of the third conductive member toward the fourth conductive member in the island area, and the forth conductive member comprises a second conductive portion extending from at least a portion of the forth conductive member toward the third conductive member in the island area, and
   wherein the first conductive portion and the second conductive portion are arranged so as to be close to or at least partially overlap each other when viewed in a direction from the first side surface toward the third side surface.

2. The electronic device of claim 1, wherein the first conductive terminals, the second conductive terminals, the first conductive member, the second conductive member, the third conductive member, and the fourth conductive member are molded in the base structure through insert injection molding.

3. The electronic device of claim 2, wherein at least a portion of each of the first conductive member, the second conductive member, the third conductive member, and the fourth conductive member is exposed through the second surface of the base structure, and the exposed portion is electrically connected to a ground of the printed circuit board.

4. The electronic device of claim 1, wherein the first conductive portion and the second conductive portion are arranged substantially parallel to a first line extending across the island area.

5. The electronic device of claim 1, wherein the first conductive portion and the second conductive portion are arranged to be spaced apart from each other by a specified interval.

6. The electronic device of claim 5, wherein an end portion of the first conductive member and an end portion of the second conductive member are arranged so as to at least partially overlap each other when viewed in the direction from the first side surface toward the third side surface.

7. The electronic device of claim 1, wherein the first conductive member comprises:
   a first conductive rib disposed in a longitudinal direction of the first side surface,
   a first conductive fixing portion disposed at one end of the first conductive rib near the third conductive member, and
   a second conductive fixing portion disposed at a remaining end of the first conductive rib near the fourth conductive member.

8. The electronic device of claim 1, wherein the second conductive member comprises:
   a second conductive rib disposed in a longitudinal direction of the third side surface,
   a third conductive fixing portion disposed at one end of the second conductive rib near the third conductive member, and
   a fourth conductive fixing portion disposed at a remaining end of the second conductive rib near the fourth conductive member.

9. The electronic device of claim 1, wherein the third conductive member comprises:
   a first plate portion disposed in a portion of the base structure,
   a first conductive extension portion extending from the first plate portion to the first side surface near the first conductive member,
   a second conductive extension portion extending from the first plate portion to the second side surface,
   a third conductive extension portion extending from the first plate portion to the third side surface near the second conductive member,
   a first seating portion extending from the first plate portion to the recess, and
   a first protrusion exposed from the first seating portion to at least a portion of the island area, wherein the first conductive portion extends from the first protrusion toward the fourth conductive member in the island area.

10. The electronic device of claim 9, wherein the connector comprises a fifth conductive member disposed in a portion of the connector edge area to be exposed, and
the fifth conductive member is seated on the first seating portion in a state in which the connector is coupled to the receptacle.

11. The electronic device of claim 10, wherein the fourth conductive member comprises:
a second plate portion disposed in a portion of the base structure,
a fourth conductive extension portion extending from the second plate portion to the first side surface near the first conductive member,
a fifth conductive extension portion extending from the second plate portion to the fourth side surface,
a sixth conductive extension portion extending from the second plate portion to the third side surface near the second conductive member,
a second seating portion extending from the second plate portion to the recess, and
a second protrusion exposed from the second seating portion to at least a portion of the island area,
wherein the second conductive portion extends from the second protrusion toward the third conductive member in the island area.

12. The electronic device of claim 11, wherein the connector comprises a sixth conductive member disposed in a portion of the connector edge area to be exposed, and
the sixth conductive member is seated on the second seating portion in a state in which the connector is coupled to the receptacle.

13. The electronic device of claim 1, wherein at least one of the multiple first conductive terminals and/or at least one of the multiple second conductive terminals transmit a radio-frequency signal in a range of 10 GHz to 100 GHz.

14. The electronic device of claim 1, further comprising:
a display arranged to be visible from an outside through at least a partial area of the housing.

15. A receptacle to be coupled to a connector, the receptacle comprising:
a base structure including a first surface, a second surface facing away from the first surface and mounted on a printed circuit board, and a side surface surrounding a space between the first surface and the second surface, wherein the side surface comprises a first side surface, a second side surface extending from the first side surface in a vertical direction, a third side surface extending from the second side surface in a direction parallel to the first side surface, and a fourth side surface extending from the third side surface in a direction parallel to the second side surface, and
wherein the base structure comprises an edge area and an island area defined by a recess having a predetermined depth from the first surface toward the second surface;
multiple first conductive terminals arranged side by side between the edge area and the island area along at least a portion of the first side surface;
multiple second conductive terminals arranged side by side between the edge area and the island area along at least a portion of the third side surface;
a first conductive member disposed on the first side surface;
a second conductive member disposed on the third side surface;
a third conductive member disposed from a periphery of the second side surface to at least a portion of the island area; and
a fourth conductive member disposed from a periphery of the fourth side surface to at least a portion of the island area,
wherein the third conductive member comprises a first conductive portion extending from at least a portion of the third conductive member toward the fourth conductive member in the island area, and the forth conductive member comprises a second conductive portion extending from at least a portion of the forth conductive member toward the third conductive member in the island area, and
wherein the first conductive portion and the second conductive portion are arranged so as to be close to or at least partially overlap each other when viewed in a direction from the first side surface toward the third side surface.

16. The receptacle of claim 15, wherein at least a portion of each of the first conductive member, the second conductive member, the third conductive member, and the fourth conductive member is exposed through the second surface of the base structure, and the exposed portion is electrically connected to a ground of the printed circuit board.

17. The receptacle of claim 15, wherein the first conductive portion is arranged substantially parallel to a first line extending across the island area, and
the second conductive portion is arranged substantially parallel to a second line extending across the island area at a position different from that of the first line.

18. The receptacle of claim 17, wherein an end portion of the first conductive portion and an end portion of the second conductive portion are arranged so as to at least partially overlap each other when viewed in the direction from the first side surface toward the third side surface.

* * * * *